United States Patent [19]

Thuries

[11] Patent Number: 5,569,840
[45] Date of Patent: Oct. 29, 1996

[54] SCREENED ELECTRICAL LINE CONTROL DEVICE

[75] Inventor: Edmond Thuries, Meyzieu, France

[73] Assignee: GEC Alsthom T & D SA, Paris, France

[21] Appl. No.: 404,734

[22] Filed: Mar. 15, 1995

[30] Foreign Application Priority Data

Mar. 16, 1994 [FR] France .................................. 94 03058
Mar. 16, 1994 [FR] France .................................. 94 03057

[51] Int. Cl.⁶ .................................................. G01M 3/28
[52] U.S. Cl. .............................. 73/40; 73/49.1; 73/40.5 R
[58] Field of Search ............................... 73/40, 40.5 R, 73/49.1

[56] References Cited

FOREIGN PATENT DOCUMENTS

| | | |
|---|---|---|
| 2097399 | 12/1993 | Canada . |
| 0572096A1 | 12/1993 | European Pat. Off. . |
| 2674337A1 | 9/1992 | France . |
| 2301403 | 7/1974 | Germany . |
| 2538314A1 | 3/1977 | Germany . |
| 3534176A1 | 7/1986 | Germany . |
| 3710488A1 | 10/1988 | Germany . |
| 54-071341 | 6/1979 | Japan . |
| WO9206385 | 4/1992 | WIPO . |

*Primary Examiner*—Hezron E. Williams
*Assistant Examiner*—Daniel S. Larkin
*Attorney, Agent, or Firm*—Sughrue, Mion, Zinn, Macpeak & Seas

[57] ABSTRACT

A pressurized gas insulated screened line comprises a plurality of sections, two adjacent sections being separated by a junction enabling demounting of a section and each section comprising at least one conductive bar held in place in a cylindrical enclosure. Each section is equipped with at least one optical fiber running from one end to the other of the section and disposed inside the enclosure. A control arrangement connected to the fiber is accommodated inside the enclosure. The optical fibers of N adjacent sections forming a module are connected to each other. One end of the N interconnected optical fibers is connected to a control station.

12 Claims, 5 Drawing Sheets

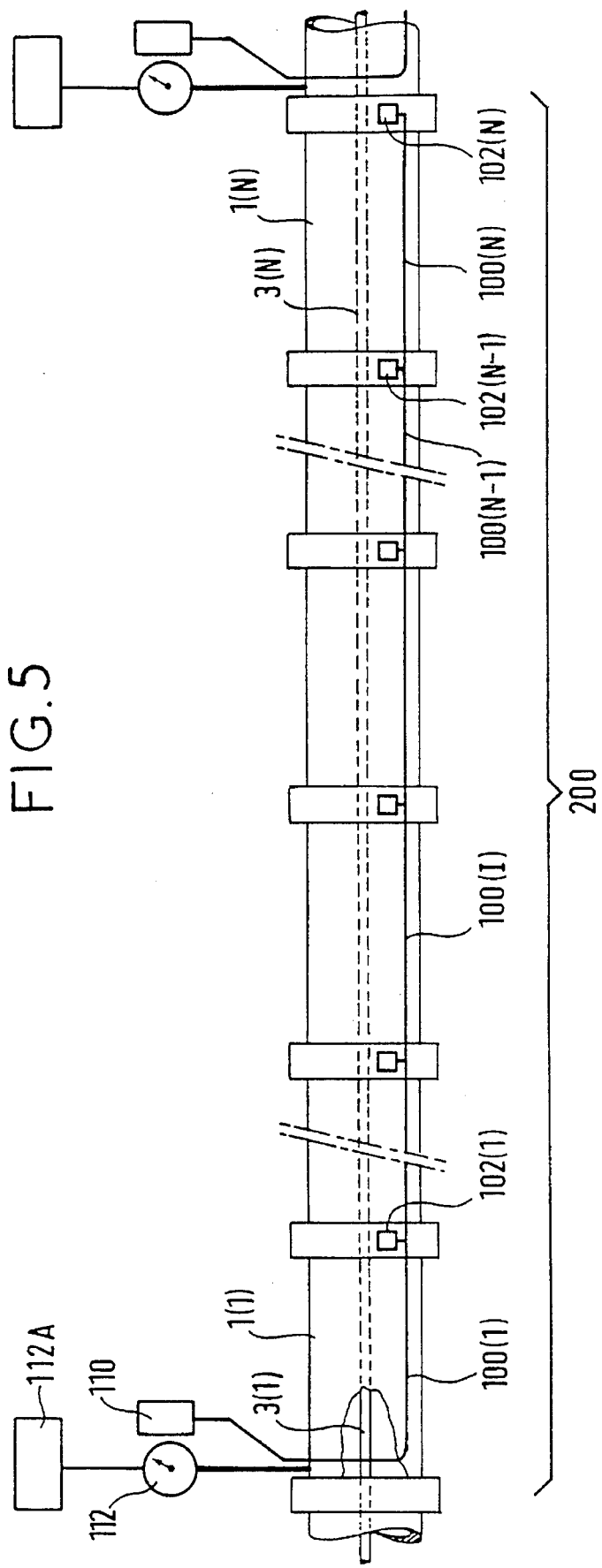

SCREENED ELECTRICAL LINE CONTROL DEVICE

BACKGROUND OF THE INVENTION

1. Field of the Invention

The present invention concerns a screened electrical line control device.

To be more precise, it concerns a pressurized gas insulated screened line comprising a plurality of sections, two adjacent sections being separated by a junction enabling the demounting of a section and each section comprising at least one conductive bar held in place in a cylindrical enclosure, as described in French patent application 92 06 733 filed 3 Jun. 1992 by the assignees of the applicant.

2. Description of the Prior Art

A line of this kind is designed to be laid on the ground or to be buried.

In the event of failure or malfunction, it is essential to be able to work on the defective section. It is therefore necessary to provide a control device and the invention proposes a particularly simple and reliable control device.

SUMMARY OF THE INVENTION

The invention consists in a control device for a pressurized gas insulated screened line comprising a plurality of sections, two adjacent sections being separated by a junction enabling demounting of a section and each section comprising at least one conductive bar held in place in a cylindrical enclosure, in which device each section is equipped with at least one optical fiber running from one end to the other of the section and disposed inside said enclosure and with a control arrangement connected to said fiber and accommodated inside said enclosure, the optical fibers of N adjacent sections forming a module being connected to each other, and one end of the N interconnected optical fibers being connected to a control station.

In the case of a screened line in which a steel enclosure contains a concentric aluminum enclosure, the space between the two enclosures being of substantially constant width, said optical fiber is contained in a metal protection tube and is disposed in said space.

Said arrangement may include at least one heat sensor, at least one UHF (ultra-high frequency) sensor for detecting partial discharge, at least one fluorescent optical fiber for detecting luminous discharge and at least one indicator of flow of dielectric gas between sections at different pressures.

The invention also concerns a gas flow indicator adapted to be used in a device of this kind.

It is mounted in an opening through a wall separating the two sections and it includes a fixed box and a member sliding in said box, this member being caused to slide when one pressure is greater than the other, so opening a passage from one section to the other and actuating a device for detecting the direction of flow of the gas between the sections.

In a preferred embodiment of the invention the sliding member is cylindrical and is connected to an annular elastic membrane around and attached to the box, a passage communicating with the section opening into a closed chamber on one side of the membrane and a passage communicating with the other section opening into a closed chamber on the other side of the membrane.

The box and the sliding member advantageously have openings in them such that, when the member is caused to slide by the membrane in one direction the gas can pass from one section to the other in this same direction.

The sliding member preferably supports two rods extending through the box, each projecting into one of the sections and actuating a detector microswitch.

The invention also concerns a gas leak detector device for a pressurized gas insulated screened line comprising a plurality of sections, two adjacent sections being separated by a junction enabling the demounting of one section.

A flowmeter installed at at least one end of a module comprising a plurality of sections is connected to a gas supply, a gas flow indicator as specified hereinabove is installed in each section.

The invention finally concerns a method of detecting gas leaks by means of a detector device of this kind.

It consists in monitoring the flowmeter(s) of each module and, in the event of reading an abnormal increase in the flowrate from the supply into a module, detecting the indications of the flow indicators of said module, the defective section being located between the two flow indicators giving a different indication.

The invention is described in more detail hereinafter with the aid of the figures which show a preferred embodiment of the invention.

BRIEF DESCRIPTION OF THE DRAWINGS

FIG. 5 shows a screened line equipped with the control device and the leak detector device of the invention.

DETAILED DESCRIPTION OF THE PREFERRED EMBODIMENT

Figure 1A:
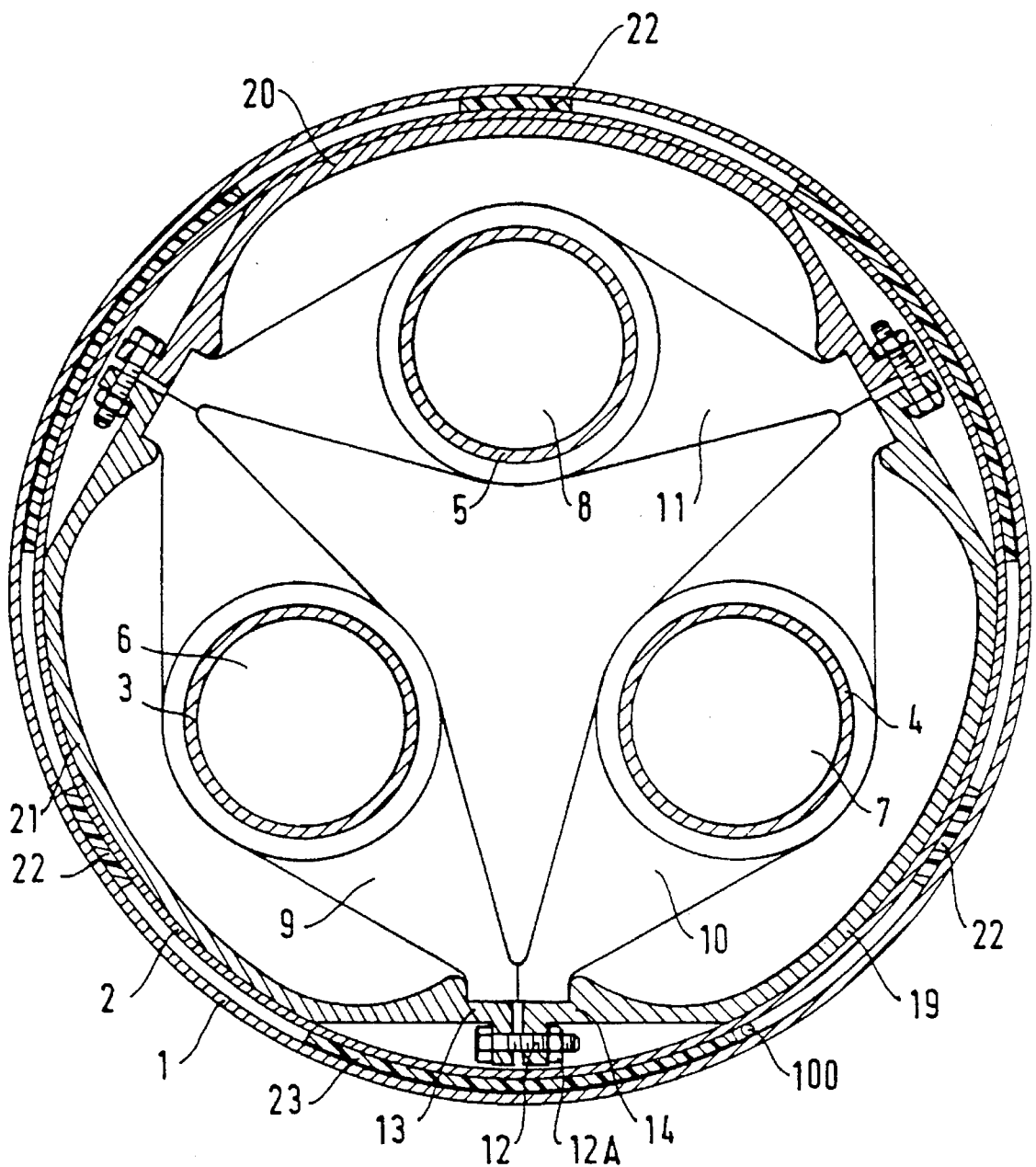
FIG. 1A is a view in transverse section of a line provided with the control device in accordance with the invention.

Referring to FIG. 1A, three parallel conductors 3, 4 and 5 in the form of aluminum or copper tubes are accommodated in respective openings 6, 7 and 8 of insulative arms 9, 10 and 11. The ends of the arms are clamped together in pairs in jaws such as the jaws 13 and 14 constituting the ends of metal hoops 19, 20 and 21; the jaws are clamped by nuts and bolts 12, 12A. The ends of the hoops form an inverted equilateral triangle with the base at the top and horizontal.

The conductor support members constitute a compact assembly. Aluminum enclosures 2 slide inside a steel enclosure 1 on strips 22 of a filled plastics or polymer material with a low coefficient of friction and sufficient hardness, for example polytetrafluoroethylene (PTFE) available under the registered trademark Teflon.

With respect to the steel enclosure 1, the aluminum enclosures 2 form a magnetic screen to reduce heating in the steel enclosure.

The PTFE strips enable the aluminum enclosures to slide on the steel enclosure 1 in the event of differential thermal expansion during operation and also during assembly of the line.

Optionally, other PTFE strips such as the strips 23 disposed at the ends of the arms enable centering of the aluminum enclosure 2 relative to the steel enclosure 1.

The hoops 19, 20, 21 have rounded profiles so that they have a high dielectric strength relative to the conductors.

Figure 1B:
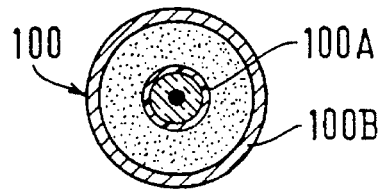
FIG. 1B is a detail view in transverse section.

An optical fiber 100 is disposed in the space between the steel enclosure 1 and the aluminum enclosure 2, the width of which is maintained substantially constant by the PTFE strips 22, 23. As shown in detail in FIG. 1B, this conventional cladded optical fiber 100A is protected by a metal, preferably steel tube 100B, possibly with a filling agent. The steel protection tube 100B can have a diameter of around 4 mm. A plurality of optical fibers like the fiber 100 shown can obviously be used.

This fiber 100 runs from one end to the other of the line section.

Figure 2:
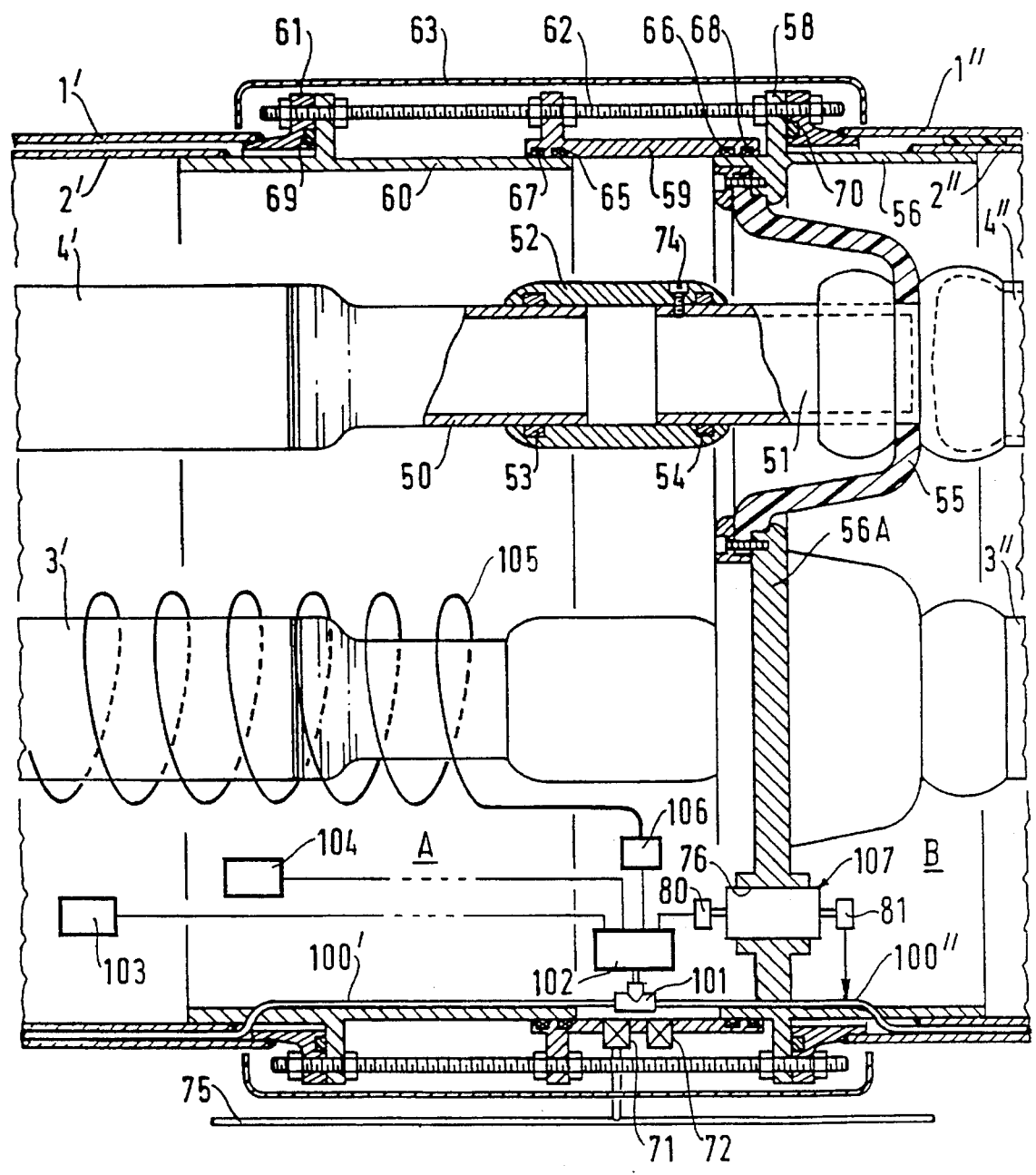
FIG. 2 shows in axial section the ends of two sections of line provided with the control device of the invention in the assembled position.

FIG. 2 shows the steel enclosure 1', the aluminum enclosure 2' and the conductors 3', 4' of a lefthand electrical line section. FIG. 2 also shows the like components 1", 2", 3", 4" of the adjacent, righthand section.

FIG. 2 shows the lefthand section connected to the righthand section in normal operation. The conductors, for example the conductors 4" and 4", have respective smaller section welded end portions 50 and 51 which are connected by a contact sleeve 52 having sliding contacts 53 and 54. This allows the conductors to expand freely without deforming laterally. The sleeve 52 can be fixed to the conductor 51 by a locking screw 74.

A metal cylinder 60 inserted in and welded to the aluminum enclosure 2' bears on a flange 61 welded to the steel enclosure 1'.

Similarly, a metal cylinder 56 inserted in the cylindrical enclosure 2" bears on a flange 58 welded to the steel enclosure 1", but the cylinder 56 and the enclosure 2" can slide relative to each other to allow differential thermal expansion. The cylinder 56 is attached to a transverse plate 56A with three openings on the edges of which insulative cones such as the cone 55 supporting the conductor 4" bear. The transverse plate 56A seals the righthand section when the latter is separated from the lefthand line section.

The cylinders 60 and 56 have respective sliding contacts 65 and 66 cooperating with a conductive cylinder 59. A seal is provided by seals 67, 68, 69 and 70.

The cylinders 56, 60, and 59 are held by threaded rods 62 passing through appropriate flanges; a cover 63 protects the device as a whole.

Insulative gas filler and purge valves or solenoid valves 71, 72 can be installed on the cylinder 59.

The gas is supplied either via a pipe 75 running along the outside of the steel enclosures or in cascade through filters via openings 76 in which flow indicators 107 and isolating valves are fitted, as described in more detail with reference to FIGS. 4 and 5.

Demounting is effected in the following manner: the cover 63 is removed, the gas supply is shut off, and the gas is purged through the valve 72, the conductors no longer being live.

The threaded rods 62 are then removed and the cylinder 59 is slid to the left.

The contact sleeve 52 is slid to the left after releasing the locking screw 74. The same procedure is carried out for the other two phases.

This completely disconnects the lefthand line section from the righthand line section.

The aluminum enclosure can be relatively thick (around 10 mm) and can in the event of a short-circuit carry the short-circuit current without danger; this current is grounded via the cylinder 56, the flange 58 and the steel tube 1". To achieve a significant saving in the cost of the line a thinner aluminum enclosure can be used, having a thickness of about 4 mm, for example. The enclosure 2" must then be insulated from the cylinder 56 by a layer of insulation (not shown in the figure); the short-circuit current punctures the aluminum enclosure and is evacuated directly through the steel enclosure, without flowing through the aluminum enclosure so that there is no risk of the latter overheating and even melting.

To facilitate maintenance, the control device associated with the optical fiber 100' of the lefthand section is preferably colocated with the sliding cylinder 59 of this junction between sections. The optical fiber 100' passes through and is sealed to the fixed cylinder 0 and is connected by a Tee-connector 101 to the optical fiber 100" of the righthand section which passes through and is sealed to the fixed cylinder 56 and the transverse plate 56A. Disconnection for maintenance or demounting of a section is effected by means of the Tee-connector 101. A protected assembly 102 comprising a microprocessor and signal converter is connected to this connector 101.

The microprocessor 102 processes data transmitted by at least one heat sensor 103 for monitoring the temperature inside the section, at least one UHF (ultra-high frequency) sensor 104 for detecting partial discharges, at least one fluorescent optical fiber 105 or the equivalent for detecting luminous discharge, especially in the event of internal arcing, the light signals transmitted by this fluorescent fiber 105 being converted by a converter 106, and at least one dielectric gas leakage detector disposed in an assembly 107.

Standards give a permissible value of leakage for a screened line of this kind and it is important to monitor leaks in order to replace the defective section if this standardized value is exceeded.

Leaks are advantageously detected by means of a gas flow indicator associated with an isolating valve controlled by the microprocessor 102 if an adequate signal is transmitted by the interconnected optical fibers 100.

Figure 3:
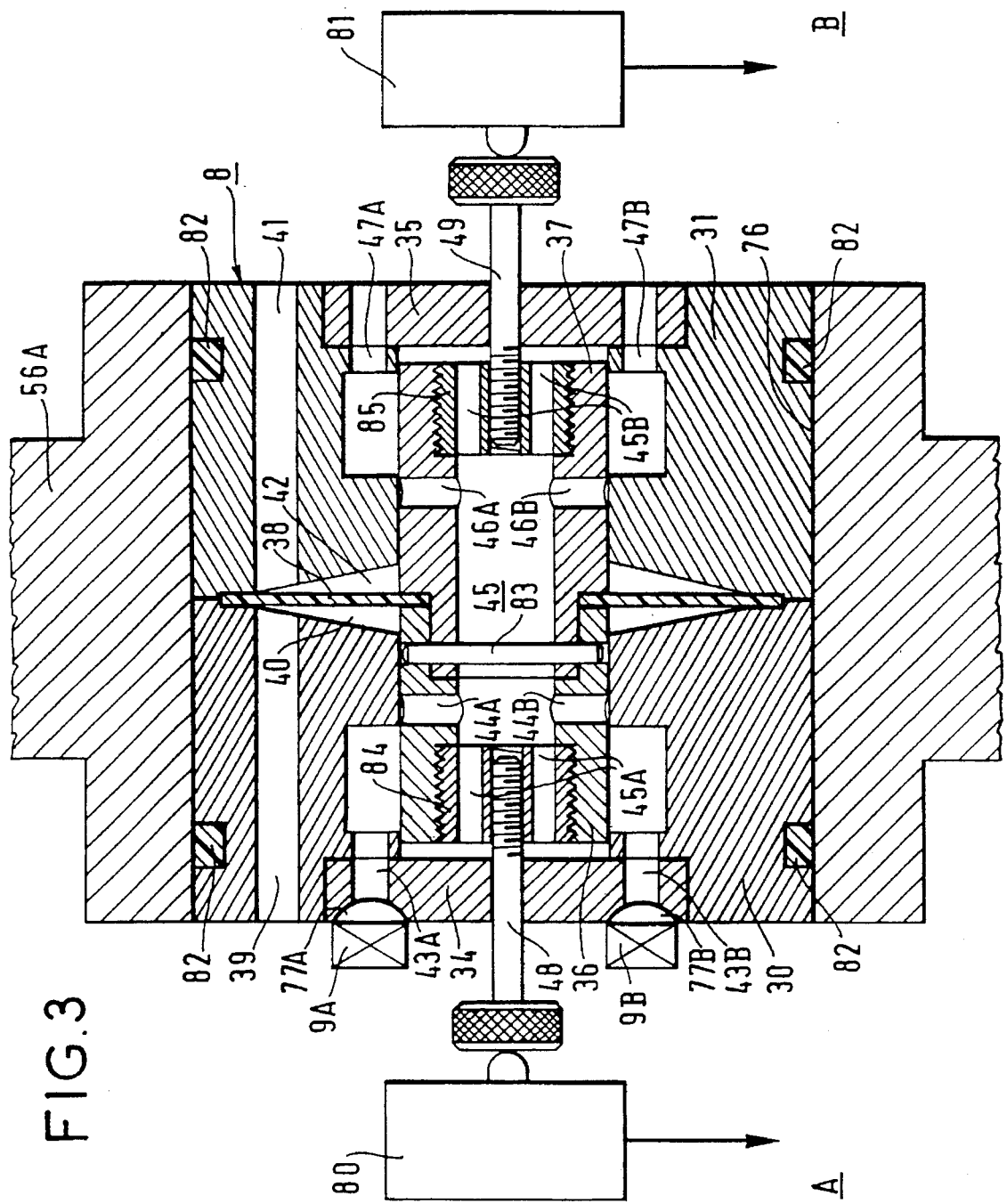
FIGS. 3 and 4 are part views in longitudinal section of a dielectric gas flow indicator in accordance with the invention.
Figure 4:
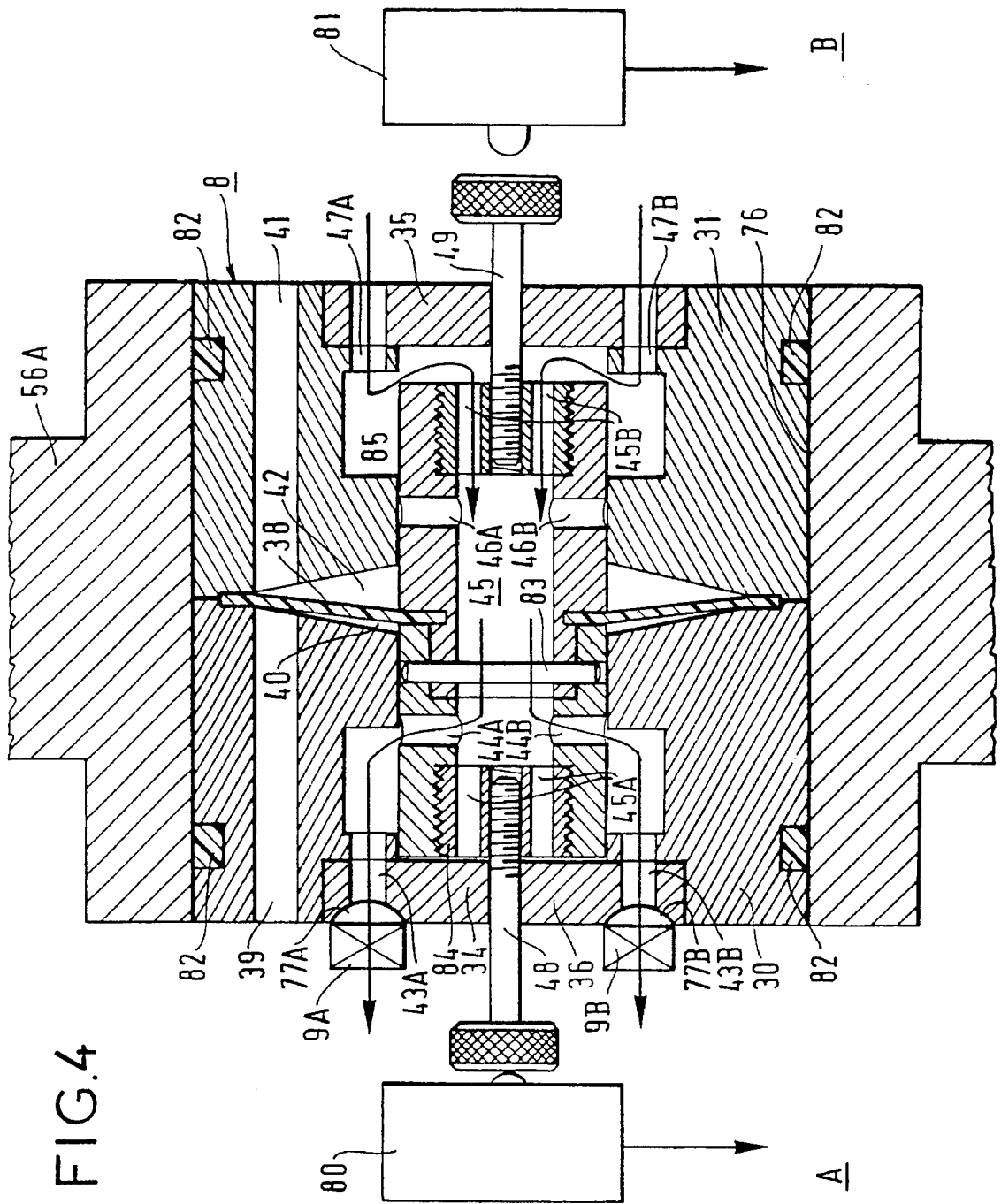

FIGS. 3 and 4 show one embodiment of a flow indicator 107 that can be used with advantage.

A flow indicator 107 is mounted on the sealing wall 56A of each junction separating a section A from an adjacent section B. This flow indicator is equally suitable for the variant with one meter and the variant with two meters.

The indicator 107 is mounted in an opening 76 in the wall 56A to which it is sealed by seals 82. There is a pressure PA in the section PA and a pressure PB in the section B.

The indicator 107 includes a fixed box made up of a plurality of parts 30 through 35 assembled together and essentially comprising a tubular part 30 through 33 whose central orifice is closed by two parts 34, 35, these parts being retained by bolt type devices that cannot be seen.

A cylindrical sliding member made up of two parts 36, 37 fastened together by means of a pin 83, for example, is accommodated in this central opening. This member 36, 37 is caused to slide if one of the pressures PA or PB is greater than the other, which opens a passage from one section A or B to the other and actuates a device for detecting the direction of flow of gas between sections A, B.

To this end, the sliding member 36, 37 is connected to an annular elastic membrane 38 around it and fastened to the box, this membrane being clamped between the various component parts of the sliding member and the box 30 and 31. A passage 39 in the box communicates with the section A and opens into a closed chamber 40 in the box on one side of the membrane 38. A passage 41 communicates with the section B and opens into a closed chamber 42 on the other side of the membrane 38. There is sufficient clearance between the sliding member and the parts 34 and 35 of the box for the sliding member to move a certain distance in the box.

The box and the sliding member 36, 37 have openings 43 through 47 in them such that if the member 36, 37 is caused to slide in one direction by the membrane 38 the gas can flow from one section to the other in this same direction. This will be further described below.

The sliding member 36, 37 supports two rods 48, 49 which pass through the box 34, 35 and are fixed to the sliding member 36, 37 by screwing them into nuts 84, 85 which have holes 45A, 45B through them, each of the rods 48, 49 projecting into one of the sections A, B and being adapted to operate a respective detector microswitch 80, 81.

As shown in FIG. 3, when the pressures PA and PB in the sections A and B are equal and the indicator 107 is in the closed position the gas is unable to pass from one section to the other, even if the isolating valves 9A and 9B are open. Filters 77A, 77B are disposed on the output side of the valves 9A and 9B.

Assume that the pressure PB becomes greater than the pressure PA, i.e. in this example that a leak occurs to the left of the wall 56A as shown. The indicator 107 then assumes the position shown in FIG. 4.

The pressure difference in the chambers 40 and 42 on either side of the membrane 38 displace it to the left. It entrains with it the sliding member 36, 37 and therefore opens a passage between the two sections A and B. The gas can therefore flow (as shown by the arrows in FIG. 4) into the openings 47, into the clearance between the sliding member and the parts of the box 34, 35 and then into the openings 45, 44, and 43.

The rods 48, 49 are at the same time displaced towards the left and the lefthand rod 48 trips the microswitch 80 which transmits to the microprocessor 102 a signal which is converted into a light signal transmitted to the optical fiber 100' of the section A. The direction of flow of the gas between the two sections A and B can therefore be detected at an external control post, this indication being processed in the manner described below.

As shown in FIG. 5, at least one flowmeter 112 enabling a supply of gas is installed at one end of modules 200 comprising N sections. The method of detecting gas leaks using this device entails monitoring the flowmeters 112 of each module 200. If it is necessary to add gas to maintain the normal pressure level in a module 200, the flow from the supply 112A is increased abnormally. The process then consists in detecting the indications of the flow direction indicators 107 of this module 200, the faulty section being between the two flow direction indicators 107 giving different indications.

The isolating valves 9A and 9B at each end of this defective section are then closed and by demounting the junctions at the ends of this section the latter can be demounted without disturbing the other sections.

In the same manner, a meter connected to a dielectric gas supply can be installed at each end of the modules.

In the same manner, a control station 110 is installed at the end of each module 200 to process the information transmitted by the interconnected optical fibers 100(I) and transmit appropriate cohands.

If a fault is detected in the section 100(I) the corresponding light signal, distinguished from the others by the send wavelength or level and processed by the microprocessor 102(I), is transmitted to the control station 110, this signal being associated with a signal identifying the section. The faulty section can therefore be identified and if necessary instructions to close the isolating valves can be sent to enable this section to be demounted or worked on.

The gas can be purged from the section via the valve 72. Once the section has been replaced or the work on it has been carried out it can be individually refilled with dielectric gas via the valve 71.

What is claimed:

1. Control device for a pressurized gas insulated screened line comprising a plurality of sections, two adjacent sections being separated by a junction enabling demounting of a section and each section comprising at least one conductor held in place in a cylindrical enclosure, in which device each section is equipped with at least one optical fiber running from one end to the other of the section and disposed inside said enclosure and with a control arrangement connected to said fiber and accommodated inside said enclosure, the optical fibers of N adjacent sections forming a module being connected to each other, and one end of the N interconnected optical fibers being connected to a control station.

2. Control device according to claim 1 for a screened line in which said enclosure is of steel and contains a concentric aluminum enclosure, the space between said two enclosures being maintained at a substantially constant thickness, in which device said optical fiber is contained in a protective metal tube and is disposed in said space.

3. Device according to claim 1 wherein said arrangement includes at least one heat sensor.

4. Device according to claim 1 wherein said arrangement includes at least one UHF (ultra-high frequency), sensor for detecting partial discharges.

5. Device according to claim 1 wherein said arrangement includes at least one fluorescent optical fiber for detecting luminous discharges.

6. Device according to claim 1 wherein said arrangement includes at least one indicator of flow of dielectric gas between sections in which the pressure is different.

7. Gas flow indicator for use in the device according to claim 6, mounted in an opening through a wall separating the two sections and including a fixed box and a sliding member in said box, said member being caused to slide if one of said pressures is greater than the other, so opening a passage from one of the sections to the other and actuating a device for detecting the direction of flow of said gas between said sections.

8. Indicator according to claim 7 wherein said sliding member is cylindrical and said sliding member is joined to an angular elastic membrane surrounding said sliding member, said angular elastic membrane being attached to the box, a passage (39) in said box communicating with one of said two sections and opening into a closed chamber (40) defined by said membrane, said box and said sliding member on one side of the membrane, and another passage (41) in said box communicating with the other one of said two sections and opening into another closed chamber (42) defined by said membrane, said box and said sliding member on the other side of the membrane, wherein pressure difference between said closed chambers causes said membrane and said sliding member to be displaced in one direction.

9. Indicator according to claim 8 wherein said box and said sliding member have openings such that when said membrane and said sliding member are displaced in said one direction by said pressure difference, said openings are connected, and said gas flows from said one of said two sections through said openings to the other one of said two sections in said one direction.

10. Indicator according to claim 7 wherein said sliding member supports two rods passing through said box, each projecting into one of said sections and being adapted to actuate a detector microswitch.

11. Gas leak detector device for a pressurized gas insulated screened line according to claim 7, further comprising:

a flowmeter installed at at least one end of a module comprising a plurality of said sections, wherein said flowmeter is connected to a gas supply, and wherein one gas flow indicator is installed on each section.

12. Method of detecting gas leaks using a device according to claim 11 comprising steps of:

monitoring said flowmeter and, on reading an abnormal increase in a flowrate from said supply into said module, detecting indications of said flow indicators of said module, and determining a faulty section as one of said sections between two flow indicators giving a different indication.

* * * * *